United States Patent
Shapiro

(10) Patent No.: US 10,078,458 B1
(45) Date of Patent: Sep. 18, 2018

(54) METHOD AND SYSTEM FOR ADAPTIVELY MIGRATING DATA IN SOLID STATE MEMORY

(71) Applicant: EMC Corporation, Hopkinton, MA (US)

(72) Inventor: Michael W. Shapiro, San Francisco, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 92 days.

(21) Appl. No.: 15/087,671

(22) Filed: Mar. 31, 2016

(51) Int. Cl.
 G06F 3/06 (2006.01)
 G06F 12/02 (2006.01)
 G06F 11/07 (2006.01)

(52) U.S. Cl.
 CPC .......... *G06F 3/0616* (2013.01); *G06F 3/0604* (2013.01); *G06F 3/0647* (2013.01); *G06F 3/0653* (2013.01); *G06F 3/0679* (2013.01); *G06F 11/076* (2013.01); *G06F 11/079* (2013.01); *G06F 11/0727* (2013.01); *G06F 3/064* (2013.01); *G06F 12/0253* (2013.01); *G06F 2212/7211* (2013.01)

(58) Field of Classification Search
 CPC ............. G06F 11/1068; G06F 11/1072; G06F 11/1076; G06F 12/0246; G06F 11/076; G06F 2212/7211; G06F 3/0604; G06F 3/064; G06F 3/0647; G06F 12/0253; G11C 16/349; G11C 29/52
 USPC ........................................................ 714/763
 See application file for complete search history.

(56) References Cited

U.S. PATENT DOCUMENTS

| | | | | |
|---|---|---|---|---|
| 8,078,923 B2* | 12/2011 | Nagadomi | .......... | G06F 11/1068 714/706 |
| 8,291,295 B2* | 10/2012 | Harari | .......... | G06F 11/1068 365/185.09 |
| 8,427,854 B2* | 4/2013 | Weinsberg | .......... | G06F 21/564 360/31 |
| 8,429,332 B2* | 4/2013 | Chen | .......... | G06F 11/1048 711/103 |
| 8,473,811 B2* | 6/2013 | Jo | .......... | G06F 13/1668 714/763 |
| 8,751,901 B2* | 6/2014 | Yano | .......... | G06F 11/1072 714/764 |
| 8,910,017 B2* | 12/2014 | Sharon | .......... | H03M 13/356 714/763 |

(Continued)

*Primary Examiner* — Demetrios C Kerveros
(74) *Attorney, Agent, or Firm* — Chamberlain, Hrdlicka, White, Williams & Aughtry

(57) ABSTRACT

A method for adaptively migrating data in solid state memory. The method includes making a first determination that a write limit of a first region of the solid state memory has been reached, and based on the first determination, allocating a second region of the solid state memory, writing a pre-migration marker to each memory location of the second region and receiving a first request to read a data fragment from a first logical address. The method further includes identifying a first memory location in the second region based on the first logical address, making a second determination that a first data fragment at the first memory location comprises a pre-migration marker, and based on the second determination, identifying a second memory location in the first region, based on the first logical address, and writing a second data fragment, retrieved from the second memory location, to the first memory location.

20 Claims, 14 Drawing Sheets

(56) References Cited

U.S. PATENT DOCUMENTS 8,996,936 B2 * 3/2015 Sevugapandian ..... G06F 11/006
　　　　　　　　　　　　　　　　　　　365/200

* cited by examiner

Previous Solid State Memory Region    Current Solid State Memory Region

Current Solid State Memory Region

Current Solid State Memory Region    Previous Solid State Memory Region    Current Solid State Memory Region

FIG. 11C1    FIG. 11C2    FIG. 11C3

Current Solid State Memory Region

METHOD AND SYSTEM FOR ADAPTIVELY MIGRATING DATA IN SOLID STATE MEMORY

BACKGROUND

Solid state memory storage devices may be used to store data. Such solid state storage devices may be based on solid state memory such as, for example, Phase Change Memory (PCM), Spin Torque Magnetic Random Access Memory, etc., that degrades as data are written to the memory. Only a limited number of writes to solid state memory may thus be permissible before the solid state memory loses its ability to reliably retain data. As such, even with perfect wear leveling, it may become necessary for a solid state memory storage device to migrate data from one region of storage to another fresh region of storage, while a user workload is in progress.

BRIEF DESCRIPTION OF DRAWINGS

FIGS. 11A-11D show exemplary memory regions, in accordance with one or more embodiments of the technology.

DETAILED DESCRIPTION

Figure 1A:
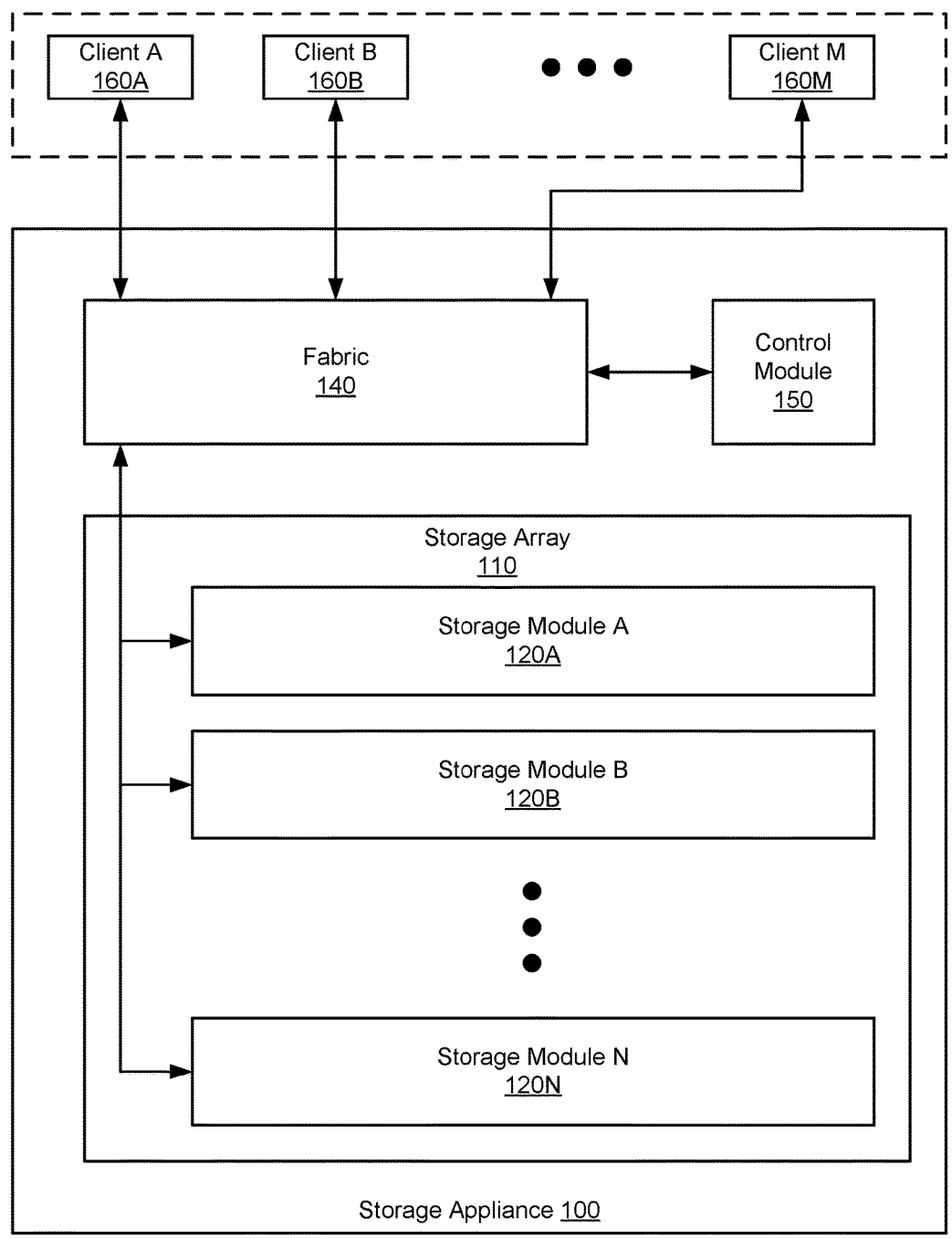
FIGS. 1A and 1B show systems, in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-11D, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology relate to data migration in solid state storage systems. More specifically, embodiments of the technology are directed to tracking the wear of one or more memory regions of a solid state storage module, and to performing a data migration, from worn memory regions to different memory regions on the same or on a different solid state storage module. A data migration being performed prior to reaching a critical degradation of the memory region, at which point reliable storage of data in the memory region may no longer be guaranteed, may thus ensure that the stored data are not compromised by a degradation of the storage medium.

Figure 1B:
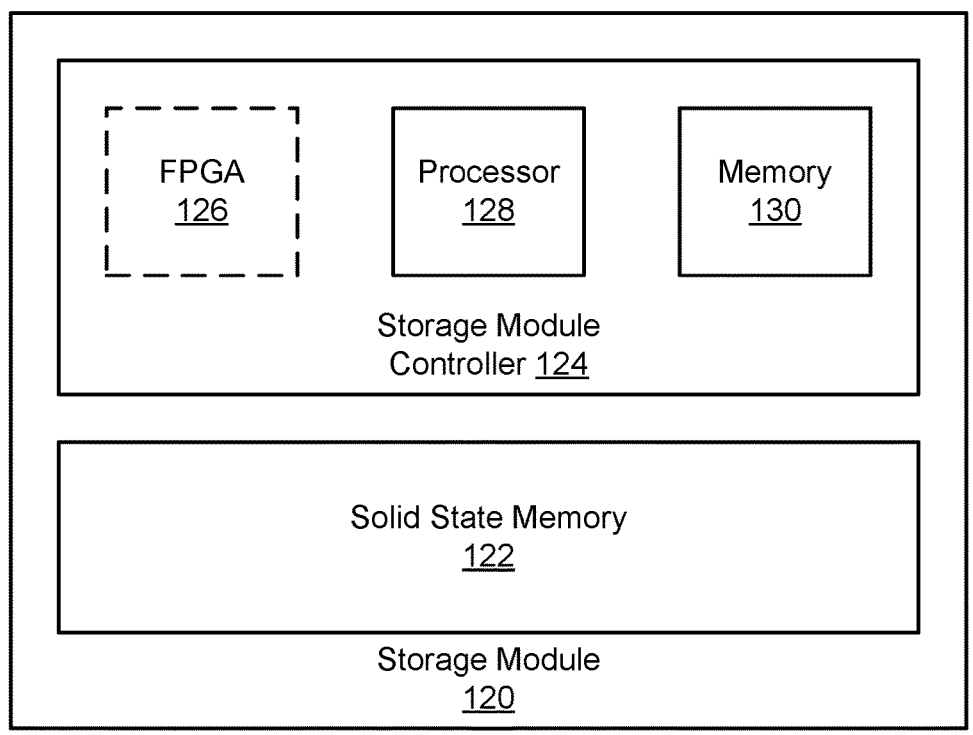

FIGS. 1A and 1B show systems in accordance with one or more embodiments of the technology. Referring to FIG. 1A, the system includes one or more clients (client A (160A)-client M (160M)) that are operatively connected to a storage appliance (100).

In one embodiment of the technology, the clients (160A-160M) may be any type of physical system that includes functionality to issue a read request to the storage appliance (100) and/or to issue a write request to the storage appliance (100). Though not shown in FIG. 1A, each of the clients (160A-160M) may include a client processor (not shown), client memory (not shown), and any other software and/or hardware necessary to implement one or more embodiments of the technology.

In one embodiment of the technology, the clients (160A-160M) are configured to execute an operating system (OS) that includes a file system, a block device driver and/or a user programming library. The file system, the block device driver and/or the user programming library provide mechanisms for the storage and retrieval of files from the storage appliance (100). More specifically, the file system, the block device driver and/or the user programming library include functionality to perform the necessary actions to issue read requests and write requests to the storage appliance. They may also provide programming interfaces to enable the creation and deletion of files, reading and writing of files, performing seeks within a file, creating and deleting directories, managing directory contents, etc. In addition, they also provide management interfaces to create and delete file systems. In one embodiment of the technology, to access a file, the operating system (via the file system, the block device driver and/or the user programming library) typically provides file manipulation interfaces to open, close, read, and write the data within each file and/or to manipulate the corresponding metadata.

In one embodiment of the technology, the clients (160A-160M) interface with the fabric (140) of the storage appliance (100) to communicate with the storage appliance (100), as further described below.

In one embodiment of the technology, the storage appliance (100) is a system that includes persistent storage such as solid state memory, and is configured to service read requests and/or write requests from one or more clients (160A-160M).

The storage appliance (100), in accordance with one or more embodiments of the technology, includes one or more storage modules (120A-120N) organized in a storage array (110), a control module (150), and a fabric (140) that interfaces the storage module(s) (120A-120N) with the clients (160A-160M) and the control module (150). Each of these components is described below.

The storage array (110), in accordance with an embodiment of the technology, accommodates one or more storage modules (120A-120N). The storage array may enable a modular configuration of the storage appliance, where storage modules may be added to or removed from the storage appliance (100), as needed or desired. A storage module (120), in accordance with an embodiment of the technology, is described below, with reference to FIG. 1B.

Continuing with the discussion of the storage appliance (100), the storage appliance includes the fabric (140). The fabric (140) may provide connectivity between the clients (160A-160M), the storage module(s) (120A-120N) and the control module (150) using one or more of the following protocols: Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. Those skilled in the art will appreciate that the technology is not limited to the aforementioned protocols.

Further, in one or more embodiments of the technology, the storage appliance (100) includes the control module (150). In general, the control module (150) is a hardware module that may be configured to perform administrative tasks such as allocating and de-allocating memory regions in the solid state memory modules (120A-120N) and making allocated memory regions accessible to the clients (160A-160M). Further, the control module may perform one or more steps to balance the wear within a memory region and/or to migrate the content of a worn memory region to a different memory region. In one embodiment of the technology, these functions (e.g., one or more of the steps described in FIGS. 3-12) are performed by the control module (150).

The control module (150) interfaces with the fabric (140) in order to communicate with the storage module(s) (120A-120N) and/or the clients (160A-160M). The control module may support one or more of the following communication standards: PCI, PCIe, PCI-X, Ethernet (including, but not limited to, the various standards defined under the IEEE 802.3a-802.3bj), Infiniband, and Remote Direct Memory Access (RDMA) over Converged Ethernet (RoCE), or any other communication standard necessary to interface with the fabric (140).

FIG. 1B shows a storage module, in accordance with one or more embodiments of the technology. The storage module (120) includes solid-state memory (122) to persistently store data. In one embodiment of the technology, the solid-state memory (122) of the storage module (120) may include, but is not limited to, Spin Torque Magnetic Random Access Memory (ST-RAM) and Phase Change Memory (PCM). Generally, the solid state memory (122) may correspond to any type of memory that has a finite number of program-erase cycles or write cycles. In one or more embodiments of the technology, the limited number of program-erase or write cycles necessitates the use of methods to avoid excessive writes to the same region of the solid state memory in order to prevent data loss, as described in detail below.

Continuing with the discussion of the storage module (120), shown in FIG. 1B, the storage module (120), in accordance with one or more embodiments of the technology, further includes a storage module controller (124). In one embodiment of the technology, the storage module controller (124) is configured to receive and service requests to read from and/or write data to the solid state memory (122). These requests may originate from the clients (160A-160M) or control module (150) and may be conveyed to the storage module controller (124) via the fabric (140). Further, the storage module controller (124) may perform or may support administrative tasks including the methods described in FIGS. 3-10.

In one embodiment of the technology, the storage module controller (124) includes a processor (128) (e.g., one or more cores, or micro-cores of a processor that are configured to execute instructions) and memory (130) (e.g., volatile memory that may be, but is not limited to, dynamic random-access memory (DRAM), synchronous DRAM, SDR SDRAM, and DDR SDRAM) to perform at least one of the steps described in FIGS. 3-10. Alternatively or additionally, the storage module controller (124) may include a field-programmable gate array (FPGA) and/or an application-specific integrated circuit (ASIC) (126). In a storage module controller that includes an FPGA and/or ASIC and a processor, the FPGA and/or ASIC may primarily service read and write requests, whereas the processor may handle or support administrative tasks, including those related to wear balancing and/or data migration, as further described below.

One skilled in the art will recognize that the architecture of the system is not limited to the components shown in FIGS. 1A and 1B. For example, the components of the storage appliance (100) may include any number of storage modules (120A-120N). Further, the storage module controller (124) of the storage module (120) and the control module (150) of the storage appliance (100) may be equipped with central processing units (CPUs), field-programmable gate arrays (FPGAs), application-specific integrated circuits (ASICs) and/or any other type of processor, without departing from the technology. In addition, the fabric may be based on communication standards other than those discussed above, without departing from the technology.

Figure 2A:
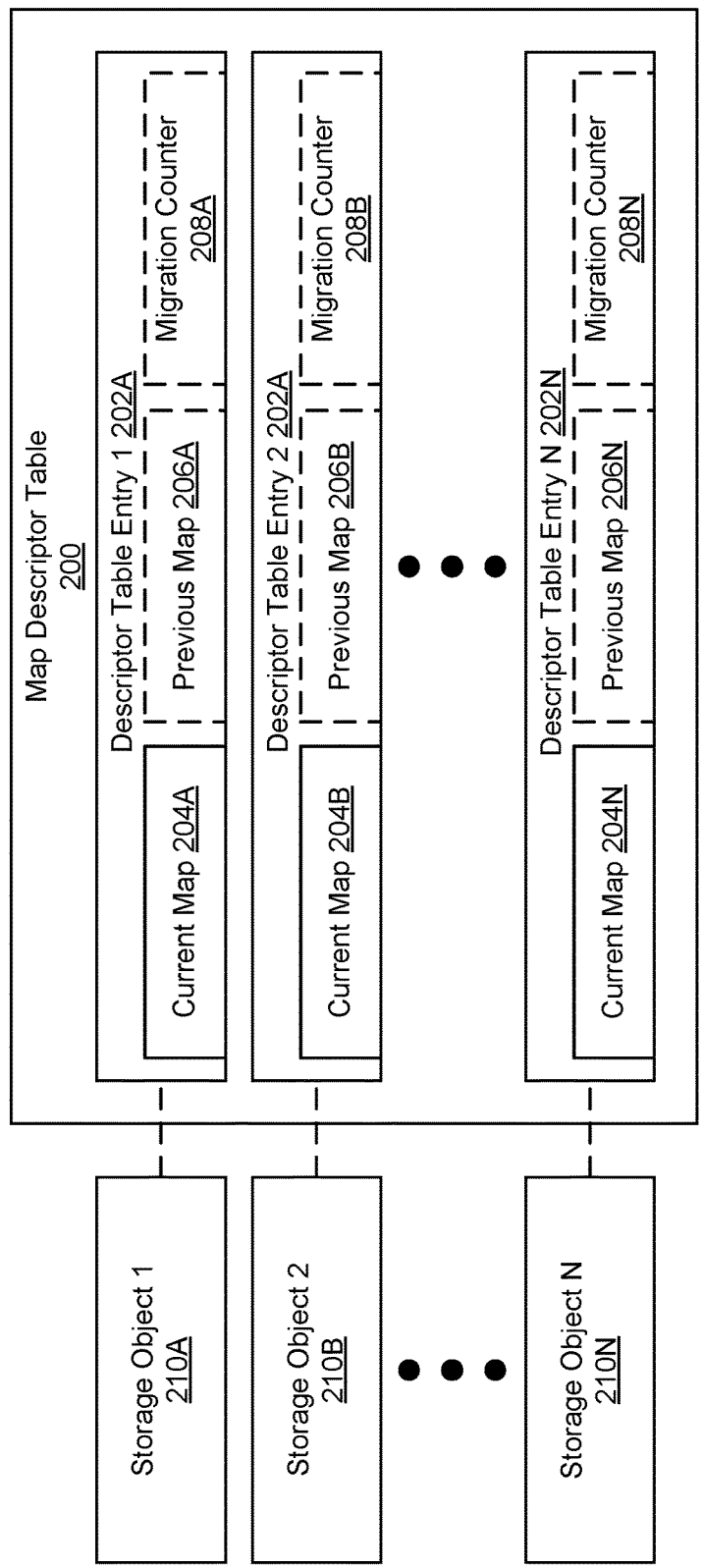
FIGS. 2A-2C show representations of data stored in solid state memory, in accordance with one or more embodiments of the technology.

FIGS. 2A-and 2B show logical representations of data stored in solid state memory, in accordance with one or more embodiments of the technology. Logical representations may be used by clients to address the solid state memory, even though the physical representations that describe how data are stored in solid state memory may be different from the logical representations. Accordingly a translation from logical to physical representation may be performed to enable read and write operations to/from the solid state memory.

In FIG. 2A, a set of storage objects (210A-210N) is shown. Each of these storage objects is associated with a descriptor table entry (202A-202N). The descriptor table entries are organized in a map descriptor table (200).

A storage object (210), in accordance with an embodiment of the technology, is data written or to be written to the solid state memory (122) of a storage module, for example by a client (160). The data may be data of various types and may be organized in one or more files, directories, archives, logical drive partitions, etc. Those skilled in the art will recognize that the data may be of any type and size, without departing from the technology. A client (160) that intends to write a storage object (210) to the solid state memory (122) or to read a storage object from the solid state memory may rely on elements of the descriptor table entry (202) corresponding to the storage object, in order to identify a memory location to which to write or to read from, respectively, as described below in FIGS. 6 and 7. Multiple descriptor table entries may be relied upon for describing a single storage object, for example, if the storage object is large, spanning multiple memory regions.

Each descriptor table entry (202), in accordance with one or more embodiments of the technology, includes a current map (204), and may further include a previous map (206) and a migration progress counter (208). The current map (204), the previous map (206), and the migration counter (208) in accordance with an embodiment of the technology, may include information for locating a memory location for a storage object (210) when the storage object is written to or read from the solid state memory (122) of a storage module (120).

A current map may include information enabling the identification of a memory location for a storage object in a memory region that is currently being used for storing the storage object, such as the physical address base or address ranges used for this portion of the object. In contrast, a previous map may include information enabling the identification of a memory location for a storage object in a memory region that was previously used for storing the storage object, but that is being phased out by migrating the data it contains to the region that is currently being used. The previously used memory region may, for example, be no longer suitable for reliable data storage because a large number of write operations to the memory region has worn out the memory region. The migration operation for transferring the data from the previously used memory region, defined by the previous map, to the currently used memory region, defined by the current map, is described below with reference to FIGS. 3-10. A description of a current/previous map is provided in FIG. 2B.

Each descriptor table entry (202), in accordance with an embodiment of the technology, further includes a migration progress counter (208). The migration progress counter (208) may serve as an indicator for the number of data fragments that are to be migrated from the worn out previous memory region to the new current memory region are remaining. No more data fragments to be migrated remain, once the migration progress counter (208) reaches zero.

Current and previous maps may be used to support read and write operations to and from the solid state memory (122) of a storage module (120), as described below with reference to FIGS. 6 and 7. More specifically, a current map may be used to write to a current memory region, and current and previous maps may be used to read from current and previous memory regions, respectively. Current and previous maps may further be used to support administrative operations, for example, in order to maintain stored information in the presence of degrading solid state memory, as described in detail in FIGS. 6 and 7.

Current and previous maps (204A-204N, 206A-206N) and migration progress counters (208A-208N) may be stored in the memory (130) of the storage module controller (124) and may be relied upon by the FPGA (126) and/or the processor (128) to direct read and/or write operations to the appropriate region in the solid state memory (122) of the storage module (120).

In one embodiment of the technology, the FPGA (126) may coordinate read and/or write requests from and to the solid state memory (122). The FPGA may thus access the current and previous maps and the migration progress counter to service these read and/or write requests. Further, the processor (128) of the storage module controller (124) and/or a processor in the control module (150) of the storage appliance (100)) may update and maintain the current maps (204A-204N), the previous maps (206A-206N) and the migration progress counter (208A-208N), using the methods described below.

Figure 2B:
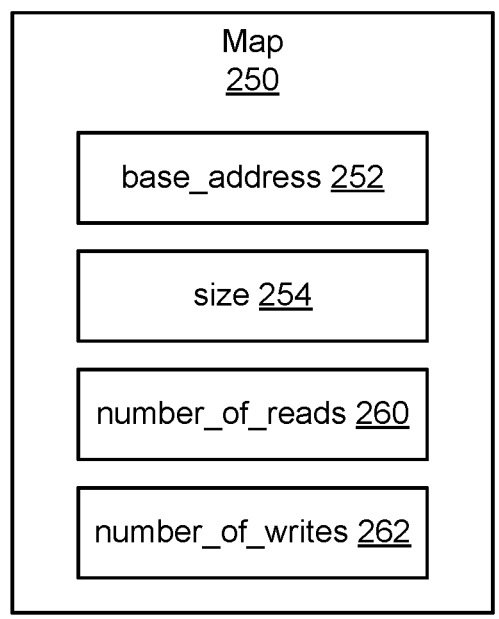
Figure 2C:
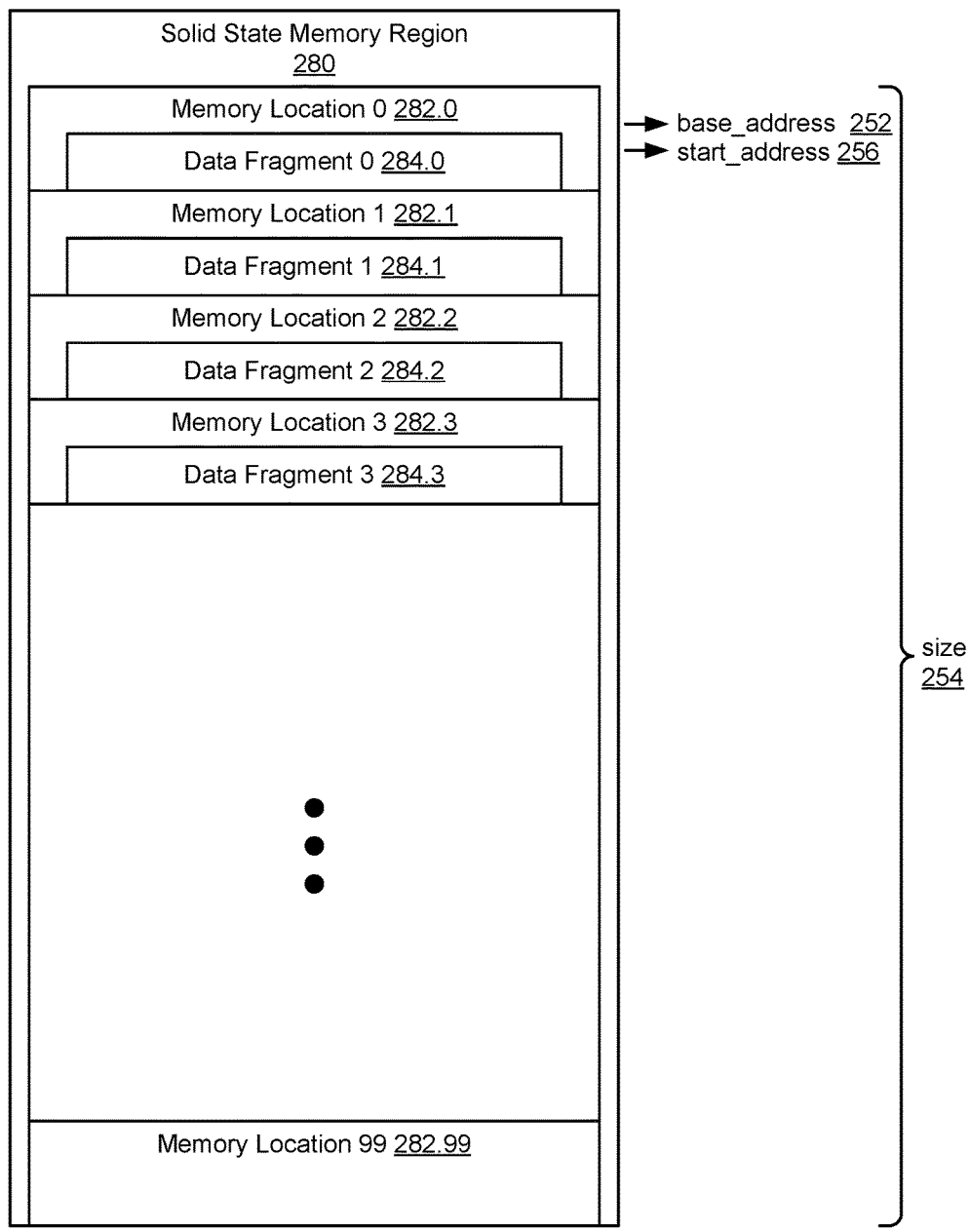

Turning to FIG. 2B, a map is shown. The map (250) in accordance with an embodiment of the technology, is representative for current maps (204A-204N) and previous maps (206A-206N), shown in FIG. 2A. A map (250), in accordance with one or more embodiments of the technology, includes the following entries: "base_address" (252), "size" (254), "number_of_reads" (260) and "number_of_writes" (262). Each of these variables is subsequently described. Further, the use of these variables is illustrated in FIG. 2C, where an exemplary memory region is shown, and in the use case described with reference to FIGS. 11A-11D.

The variable "base_address" (252), in accordance with an embodiment of the technology, specifies the beginning of the memory region described by the map (250). "base_address" may be specified, for example, as an offset value that enables read and/or write operations pertaining to a storage object to be directed to an appropriate physical storage location in the solid state memory. "base_address" may thus point to the first memory location of a memory region, regardless of where that memory region is located in the solid state memory.

The variable "size" (254), in accordance with an embodiment of the technology, specifies the size of the memory region described by the map (250). Depending on how the solid state memory is addressed, "size" may be a number of memory locations. "size", in accordance with an embodiment of the technology, is the number of memory locations required to accommodate the storage object, stored in the memory region.

An illustration of the use of the variables "base_address" (252) and "size" (254) is provided below, with reference to FIG. 2C.

The variable "number_of_reads" (260), in accordance with an embodiment of the technology, documents the number of read operations from the solid state memory region described by the map (250). Accordingly, with each read operation, regardless of the memory location in the solid state memory that is being accessed, "number_of reads" (260) is incremented. "number_of reads" (260) in the map (250) may be optional, i.e., in some embodiments of the technology, the map (250) may not include "number_of reads".

The variable "number_of_writes" (262), in accordance with one or more embodiments of the technology, documents the number of write operations to the solid state memory region described by the map (250). Accordingly, with each write operation, regardless of the memory location in the solid state memory region described by the map (250) that is being accessed, "number_of_writes" (262) is incremented.

A map, in accordance with one or more embodiments of the technology, is used to establish a mapping between a logical address provided by a client when attempting to perform a read or write operation, and a physical address pointing to a particular memory location. Although in the mapping, subsequently described and used by the methods of FIGS. 3-10 a logical address is translated to a physical address by applying an offset, other mappings may be implemented without departing from the invention. For example, the logical to physical mapping function may make use of address randomization, a lookup table, a mathematical function, or other methods, without departing from the invention.

FIG. 2C shows an exemplary structure of a solid state memory region (280), in accordance with one or more embodiments of the technology. The solid state memory region (280) may be a memory region allocated in the solid state memory (122) of a storage module (120) and may be used to accommodate a storage object (210). The solid state memory region (280) may be addressed using elements of a map (250), e.g. using the variable "base_address" (252). Further the storage object stored in the solid state memory region may be of a size, specified by "size" (254).

The exemplary solid state memory region in FIG. 2C includes 100 memory locations (282.0-282.99) to accommodate 100 data fragments that form the storage object. Each memory location may be a sub region of a specified size, in the solid state memory region. A memory location may include a specified number of bits (e.g., if a memory location is configured to store a single variable only), or it may span larger regions, e.g., bytes, kilobytes, megabytes, etc. A memory location may be occupied by a data fragment (e.g., data fragments 0-3 (284.0-284.3)), or it may be empty (e.g., memory location 99 (282.99). A complete set of data fragments, stored in the solid state memory region, may form a storage object, as previously described in FIG. 2B.

Each of the memory locations (282.0-282.99) may be addressed using a combination of "base_address (252) and an additional offset from the base address. Consider, for example, a scenario in which the solid state memory region (280), as shown in FIG. 2C, begins at base address 1,000. To reach the first data fragment (data fragment 0 (284.0)) of the storage object stored in the solid state memory region (280), the base address "1,000" may be used in combination with memory location 0. To reach the third data fragment (data fragment 2 (284.2)), the base address "1,000" may be used in combination with memory location 2.

One skilled in the art will recognize that the solid state memory regions are not limited to the exemplary solid state memory region shown in FIG. 2C. For example, the size of the solid state memory region may vary. Further, map entries including "base_address" and "size" may be expressed using various formats. While in the above description discrete numbers (e.g. memory location 0, 1, 2, . . . ) were used to express these quantities, they may alternatively be expressed using other units, for example units of memory, e.g., bits, bytes, kilobytes, etc.

Figure 3:
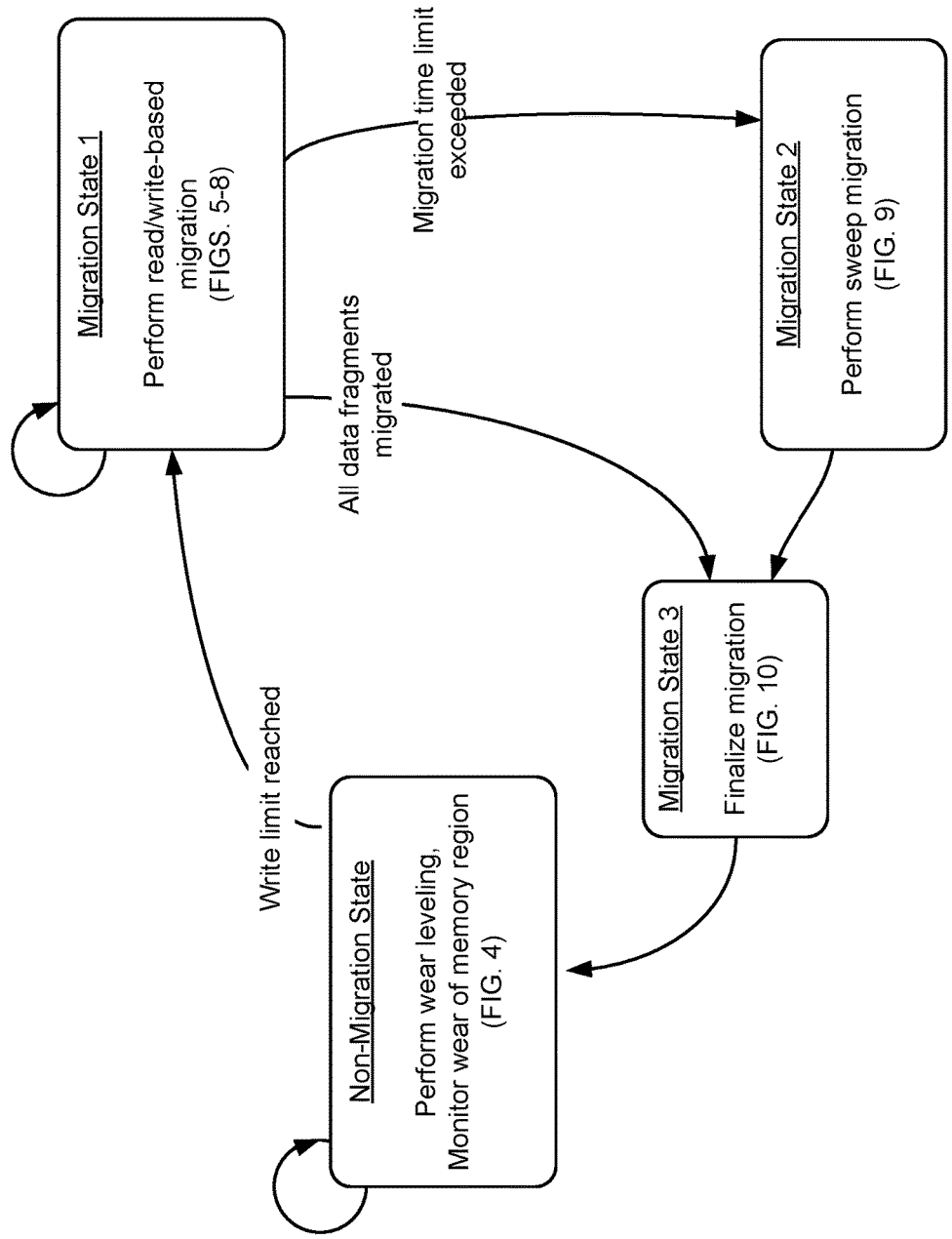
FIG. 3 shows a state diagram, in accordance with one or more embodiments of the technology.

FIG. 3 shows a state diagram, in accordance with one or more embodiments of the technology. A state machine, based on the state diagram, may be executed for a particular memory region, used for storing a particular storage object. Other state machines may simultaneously be executed for other memory regions. The state diagram may be executed by the control module of the storage appliance. While the state machine is in a particular state, methods described by various flowcharts may be executed. Specifically, while in the non-migration state, a method for wear leveling and/or a method for monitoring the wear of the memory region (described in FIG. 4) may be executed. Read and/or write operations from/to the memory region may also occur while the system is in the non-migration state. A transition from the non-migration state to migration state 1 may occur if a determination is made that a write limit has been reached, for example, because, as a result of numerous write operations to the memory region, the memory region is reaching its wear limit. While in migration state 1, methods for read and/or write-triggered migration (described in FIGS. 5-8) may be performed to migrate data fragments from the worn memory region to a new memory region. A single data fragment may be migrated in a single read or write operation. The system may remain in migration state 1 until either all data fragments have been migrated via the read and/or write operations performed in migration state one, or alternatively until a migration time limit is exceeded. A transition from migration state 1 to migration state 2 may occur if the migration time limit is exceeded. In migration state 2, a sweep migration (described in FIG. 9) may be performed. During the sweep migration, all data fragments of the data object that have not yet been migrated may be migrated. Subsequently, a transition to migration state 3 may occur. The transition to migration state 3 may also directly occur from migration state 1 if all data fragments have been migrated. In migration state 3, the migration is finalized (as described in FIG. 10) to de-allocate the previously used memory region. After the finalization of the migration in migration state 3, a state transition back to the non-migration state may occur.

In one or more embodiments of the technology, although not explicitly shown in the state diagram, read and/or write operations from/to the memory region may occur at any time regardless of the currently active state.

FIGS. 4-10 show flowcharts in accordance with one or more embodiments of the technology.

While the various steps in the flowcharts are presented and described sequentially, one of ordinary skill will appreciate that some or all of these steps may be executed in different orders, may be combined or omitted, and some or all of the steps may be executed in parallel. In one embodiment of the technology, the steps shown in FIGS. 4-10 may be performed in parallel with any other steps shown in FIGS. 4-10 without departing from the technology.

Figure 4:
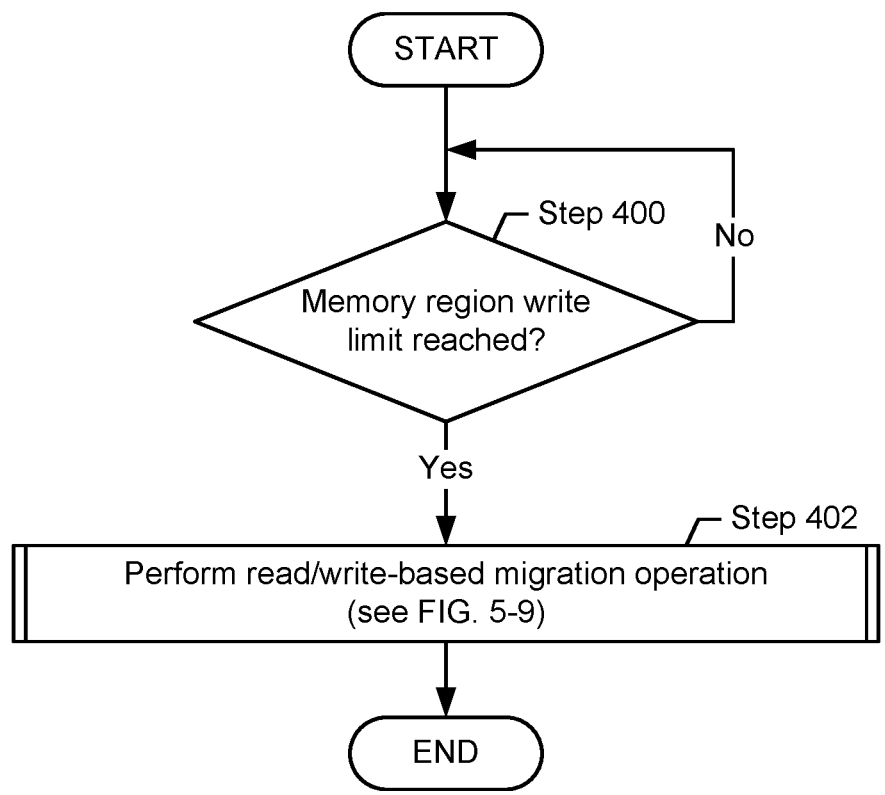
FIGS. 4-10 show flowcharts, in accordance with one or more embodiments of the technology.

FIG. 4 shows a method for determining whether the memory region has reached a wear level that necessitates the migration to a new memory region in order to avoid a potential loss of data, in accordance with one or more embodiments of the technology. The method of FIG. 4 may be repeatedly executed while the system is in the non-migration state (see FIG. 3).

In Step 400, a determination is made about whether the solid state memory region's wear limit has been reached. The determination may be made, for example, based on the number of performed write operations. An assumption may be made that all memory locations of the memory region are worn approximately equally due to, for example, periodically performed wear level operations. Based on this assumption, a threshold may be set to determine that the memory region is worn, once the number of writes performed to a memory location approaches a maximum number of writes, at which point the memory location may no longer reliably retain data. The threshold may be chosen to include a safety margin. For example, the threshold may be set such that the memory region write limit is considered to be reached once 70% of the maximally permissible writes have been performed.

If the memory region write limit has not yet been reached, the method may remain in Step 400. Alternatively, if a determination is made that the memory region write limit has been reached, the method may proceed to Step 402.

In Step 402, a read and/or write-based migration operation is performed, as described in FIGS. 5-8. Once Step 402 is executed, migration state 1 becomes the active state for the memory region (see FIG. 3).

Figure 5:
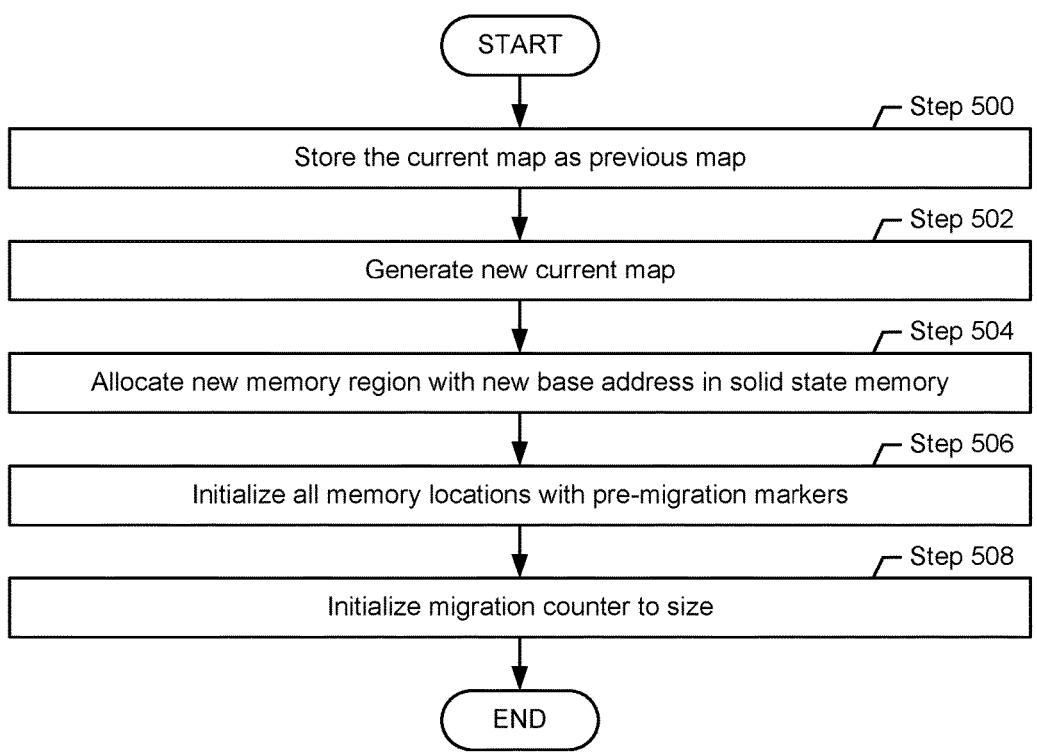

FIG. 5 shows a method for configuring a new memory region to be used as a new current memory region, in accordance with one or more embodiments of the technology. The new memory region may subsequently be used as a storage region to which data from the worn memory region is migrated. The method of FIG. 5 may be executed once, when the memory region enters migration state 1 (see FIG. 3).

In Step 500, the current map, defining the memory region that is to be migrated, is designated the previous map. Concurrently therewith, the current memory region becomes the previous memory region.

In Step 502, a new current map is generated. The new current map, in the subsequent steps, is used to define the memory region to which the data is migrated from the previous memory region.

In Step 504, a new memory region with a new base address is allocated in the solid state memory. The new memory region may be a memory region of a size equal to the size of the memory region to be migrated. The new memory region and the memory region may be located on the same storage module, or they may be located on different storage modules. The new memory region may be located using the new memory region's base address. The base address of the new memory region may be stored in the newly generated current map.

In Step 506, pre-migration markers are written to the memory locations of the newly allocated memory region. A pre-migration marker, in accordance with an embodiment of the technology indicates that a data fragment has not yet been migrated to the memory location where the pre-migration marker is located. Accordingly the pre-migration marker, may be used for tracking the progress of a migration operation. For example, if, as a result of a read operation, a pre-migration marker is obtained, the pre-migration marker indicates that a migration has not yet been performed for the requested memory fragment, and that the memory fragment therefore needs to be retrieved from the previous memory region, as described in FIG. 7.

In one embodiment of the technology, the pre-migration entry is an invalid data pattern that, when read, causes a read error. More specifically, in one embodiment of the technology, the memory location includes an error-correcting code (ECC). Accordingly, the data pattern may include redundant bits that may enable error detection and/or correction. The pre-migration marker is a data pattern selected such that execution of the redundant bits used for ECC purposes causes the detection of a mismatch, thus triggering an ECC error. In one embodiment of the technology, the data pattern used as a pre-migration marker is designed such that a particularly rare ECC error is caused. Under the assumption that this type of error, under regular operating conditions, is highly unlikely to occur, detection of this particular ECC error indicates a memory region, for which a migration has not yet been performed. Those skilled in the art will recognize that a pre-migration marker may be any other type of distinct memory pattern, a register, or any other construct that allows the identification of a memory location as not yet storing a data fragment, without departing from the technology.

In Step 508, "migration_counter" is set to "size". The variable "migration_counter", in accordance with an embodiment of the technology, is used, as described below, to track the migration progress. As previously discussed, "size" corresponds to the number of data fragments to be migrated.

Figure 6:
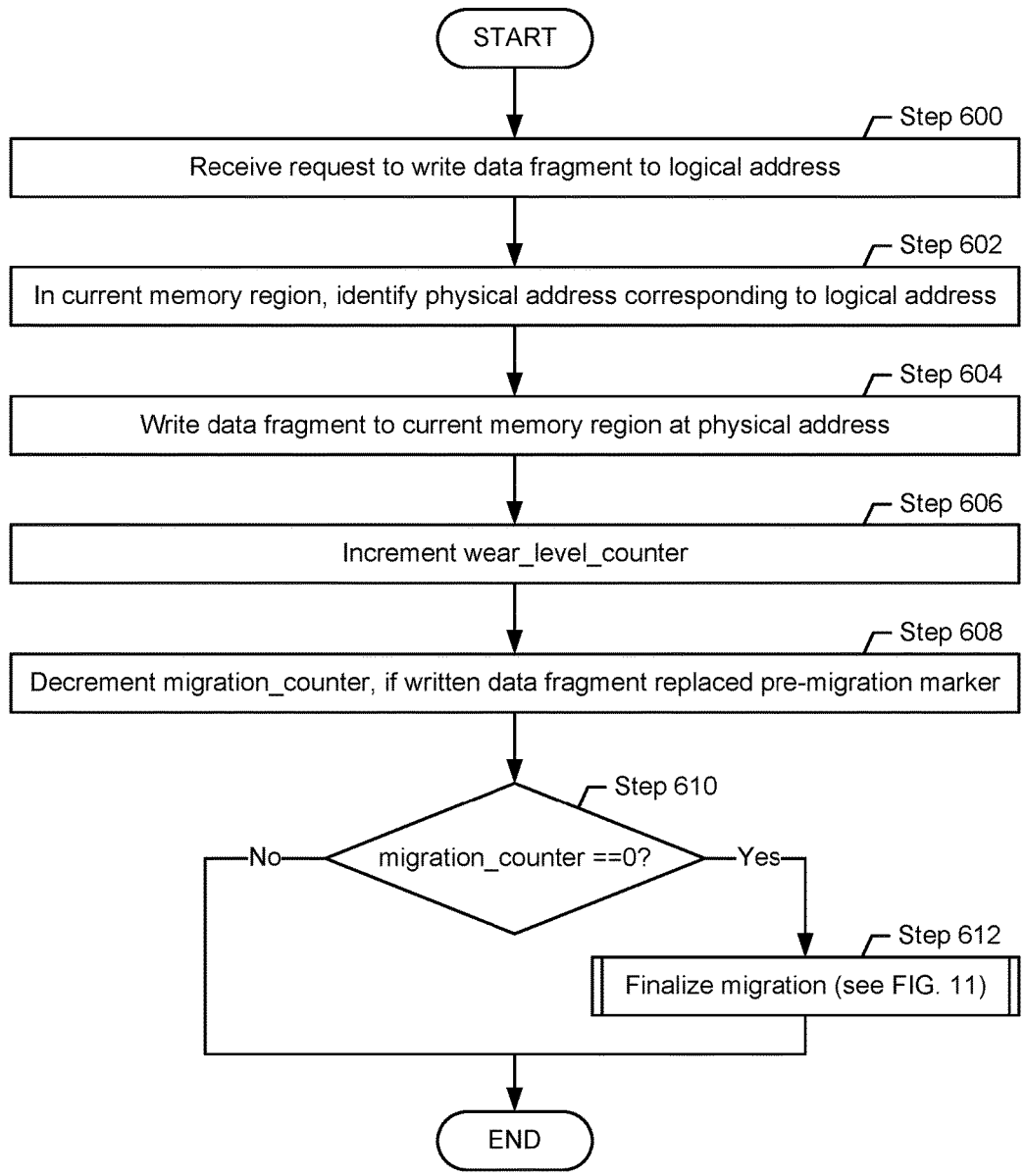

FIG. 6 shows a method for performing a write operation to a solid state memory region, in accordance with one or more embodiments of the technology.

Turning to FIG. 6, in Step 600, a write request to write a data fragment to a logical address is received by the storage appliance. The write request may have been received from a client attempting to write to the solid state memory of the storage appliance. The request may be received by the storage appliance and may reach the storage module controller of the storage module to which the client is attempting to write. The request, in accordance with an embodiment of the technology, includes a data fragment to be written and a logical address to be written to (e.g., memory locations 1, 2, 3, etc., as illustrated in FIG. 2C).

In Step 602, the physical address in the current memory region, corresponding to the logical address, is identified. This address translation may enable the storage appliance to identify the memory location where the data fragment is to be stored in a particular storage module. The address translation may be performed by the storage module controller, e.g., by an FPGA of the storage module controller that may be specialized in rapidly performing logical to physical address translations during write or read operations.

In Step 604, the data fragment is written in the solid state memory to the memory location identified by the physical address. The writing of the data fragment replaces the pre-migration marker, if no prior write operation to the memory location has previously occurred. If a data fragment was previously written to the memory location, the data fragment replaces the data fragment stored at the memory location. In Step 606, the variable "wear_level_counter" is incremented. "wear_level_counter" may be used to monitor the wear of the memory region. Once a certain counter level is reached, a wear level operation may be performed.

In Step 608, the variable "migration_counter" is decremented, if the data fragment, written in Step 604, replaced a pre-migration marker. "migration_counter" is, however, not decremented if the data fragment is found to have replaced another data fragment at the memory location.

In Step 610, a determination is made about whether "migration counter" is equal to zero. The "migration_counter" reaching zero indicates that at least one write operation has been performed for each memory location of the current memory region, in accordance with an embodiment of the invention. All data fragments of the storage object may thus be stored in the current memory region and may be retrieved from there, thus rendering the previous memory region obsolete. If a determination is made that "migration counter" equals zero, the method may proceed to Step 612, where the migration from the previous to the current memory region is finalized, as further described in FIG. 11. Progression to Step 612 may result in a state transition from migration state 1 to migration state 3 (see FIG. 3). If a determination is made that "migration_counter" has not yet reached zero, subsequent write cycles (FIG. 6) or read cycles (FIG. 7) may eventually cause "migration_counter" to reach zero.

Although the method described in FIG. 6 is discussed in context of an ongoing migration (e.g., while migration state 1 in FIG. 3 is the active state), similar write operations may also be performed while the memory region is in a different state (e.g., in the non-migration state, migration state 2, or migration state 3, shown in FIG. 3). When no migration is ongoing, the execution of the method of FIG. 6 may simplify. For example, there may be no need to decrement "migration_counter" or to check the value of "migration_counter".

Figure 7:
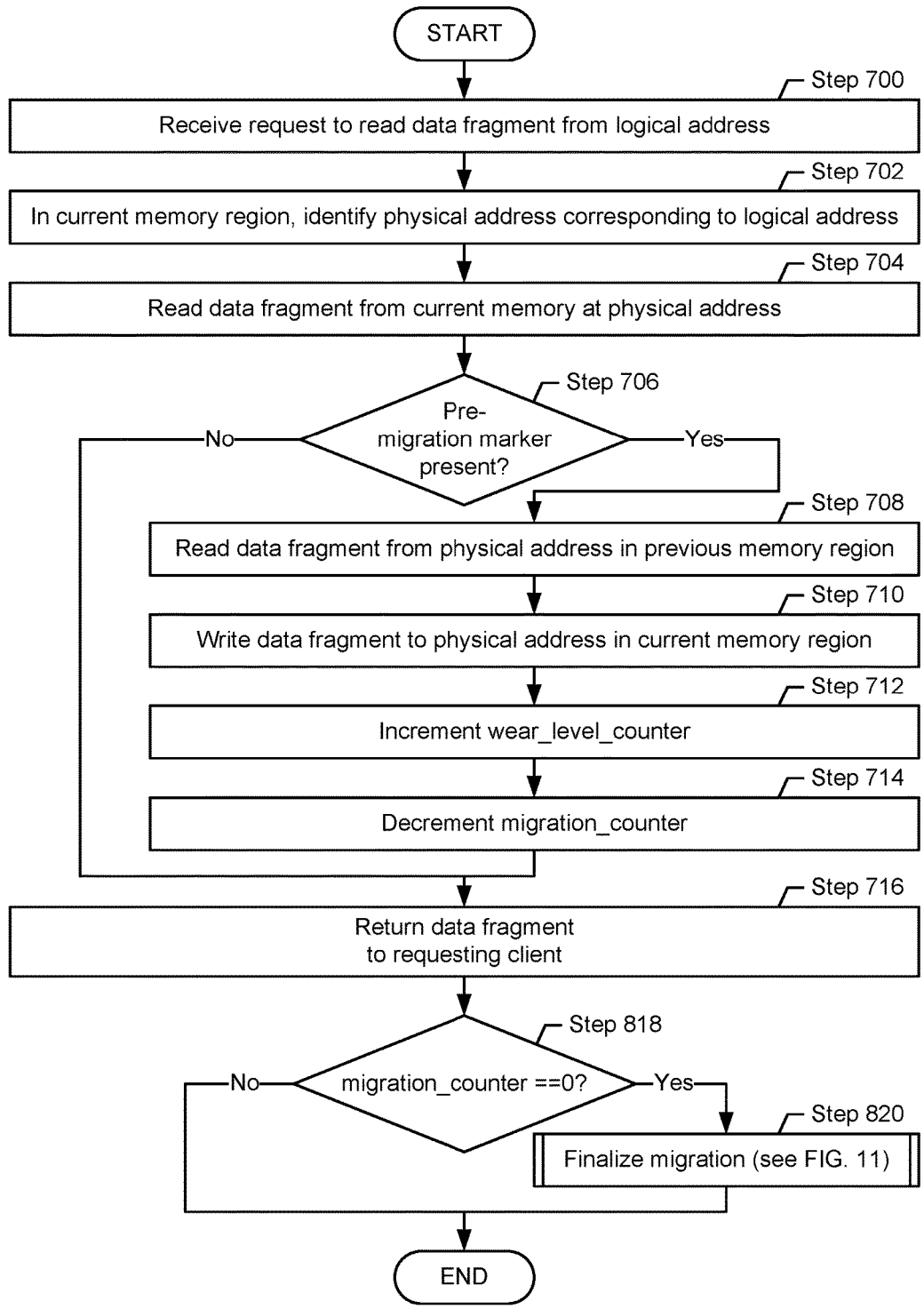

FIG. 7 shows a method for performing a read operation to a solid state memory region, in accordance with one or more embodiments of the technology.

Turning to FIG. 7, in Step 700, a read request to read a data fragment from a logical address is received by the storage appliance. The read request may have been received from a client attempting to read from the solid state memory of the storage appliance. The request may be received by the storage appliance and may reach the storage module controller of the storage module from which the client is attempting to read. The request, in accordance with an embodiment of the technology, includes a logical address to be read from (e.g., memory location 1, 2, 3, etc., as illustrated in FIG. 2C).

In Step 702, the physical address in the current memory region, corresponding to the logical address, is identified. This address translation may enable the storage appliance to identify the memory location from where the data fragment is to be retrieved. The address translation may be performed by the storage module controller, e.g., by an FPGA of the storage module controller that may be specialized in rapidly performing logical to physical address translations during write or read operations.

In Step 704, the data fragment is read from the memory location identified by the physical address.

In Step 706, a determination is made about whether the data fragment, read in Step 704, includes a pre-migration marker. If the data fragment does not include a pre-migration marker, the method may directly proceed to Step 716.

A determination that the data fragment includes a pre-migration marker, in accordance with an embodiment of the technology, suggests that a data fragment has not yet been migrated from the previous memory region to the current memory region, for the addressed memory location. If a determination is made that the data fragment includes a pre-migration marker, the method may thus proceed to Step 708.

In Step 708, a second read operation is performed to obtain the data fragment from the previous memory region. In one embodiment of the technology, the previous and the current memory regions are similarly organized. Accordingly, the correct physical memory location for reaching the memory location in the previous memory region may be obtained by substituting the base address of the current memory region with the base address of the previous memory region (see, e.g., FIGS. 2A-2C).

In Step 710, the data fragment, obtained from the previous memory region, is written to the memory location of the current memory region, addressed by the physical address obtained in Step 702. The write operation of Step 710 thus overwrites the pre-migration marker with the migrated data fragment from the previous memory region.

In Step 712, the variable "wear_level_counter" is incremented. In Step 714, the variable "migration_counter" is decremented.

In Step 716, the data fragment obtained from either the previous memory region in Step 708, or from the current memory region in Step 704, is returned to the client that requested the data fragment. In one embodiment of the invention, in Step 716, a regular ECC operation is performed on the data fragment obtained in Step 704 or 708, for any ECC error that is not resulting from the data pattern used to encode the pre-migration marker. The ECC operation may correct correctable errors and/or may return ECC error messages for non-correctable errors.

In Step 718, a determination is made about whether "migration counter" is equal to zero. If a determination is made that "migration counter" equals zero, the method may proceed to Step 720, where the migration from the previous to the current memory region is finalized, as further described in FIG. 11. Progression to Step 720 may result in a state transition from migration state 1 to migration state 3 (see FIG. 3). If a determination is made that "migration_counter" has not yet reached zero, subsequent write cycles (FIG. 6) or read cycles (FIG. 7) may eventually cause "migration_counter" to reach zero.

Although the method described in FIG. 7 is discussed in context of an ongoing migration (e.g., while migration state 1 in FIG. 3 is the active state), similar write operations may also be performed while the memory region is in a different state (e.g., in the non-migration state, migration state 2, or migration state 3, shown in FIG. 3). In the non-migration state, the execution of the method of FIG. 7 may simplify. For example, the data fragment may always be read from the current memory region, and therefore Steps 706-714 may not be performed.

Figure 8:
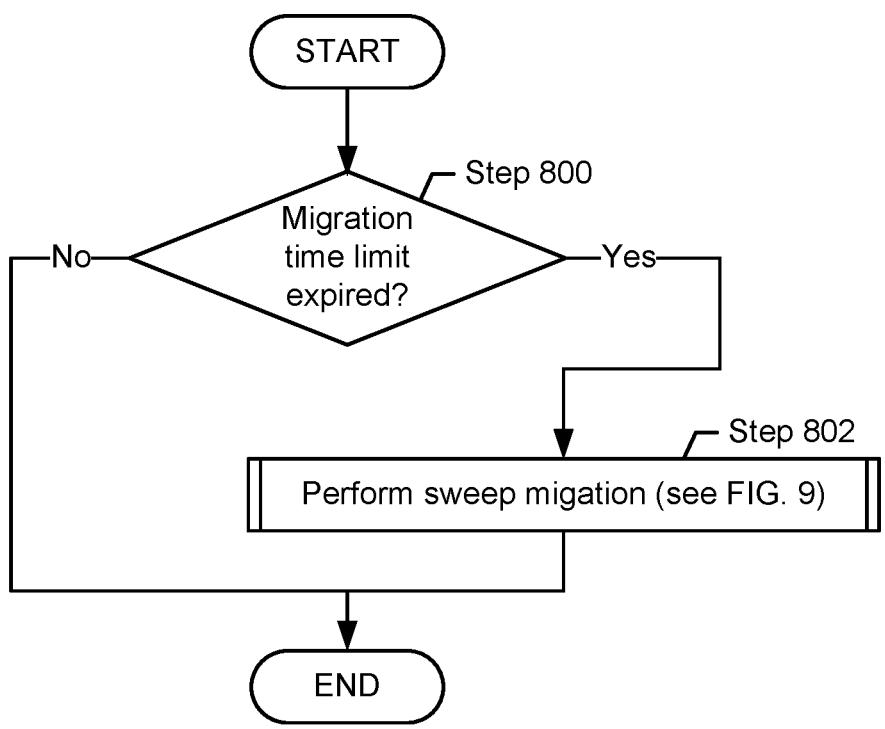

FIG. 8 shows a method for determining whether a migration time limit has expired, in accordance with one or more embodiments of the technology. The migration time limit may be reached, for example, once migration state 1 (see FIG. 3) is the active state for a certain duration. The migration time limit may be reached if the read and write operations of FIGS. 6 and 7 only access certain memory locations. As a result, data fragments in other memory locations may never have been migrated. Non-migrated data fragments may eventually become problematic because the solid state memory, toward the end of its lifetime, may have reduced reliability and endurance, thus resulting in a potential corruption of the memory fragments remaining in the previous memory region over a prolonged time. Accordingly, in one embodiment of the technology, the migration time limit is selected to avoid this scenario.

Turning to FIG. 8, in Step 800, a determination is made about whether the migration time limit has expired. If the migration time limit has expired, the method may proceed to Step 802, where a sweep migration, described in FIG. 9, is performed, in order to migrate remaining non-migrated data fragments.

Figure 9:
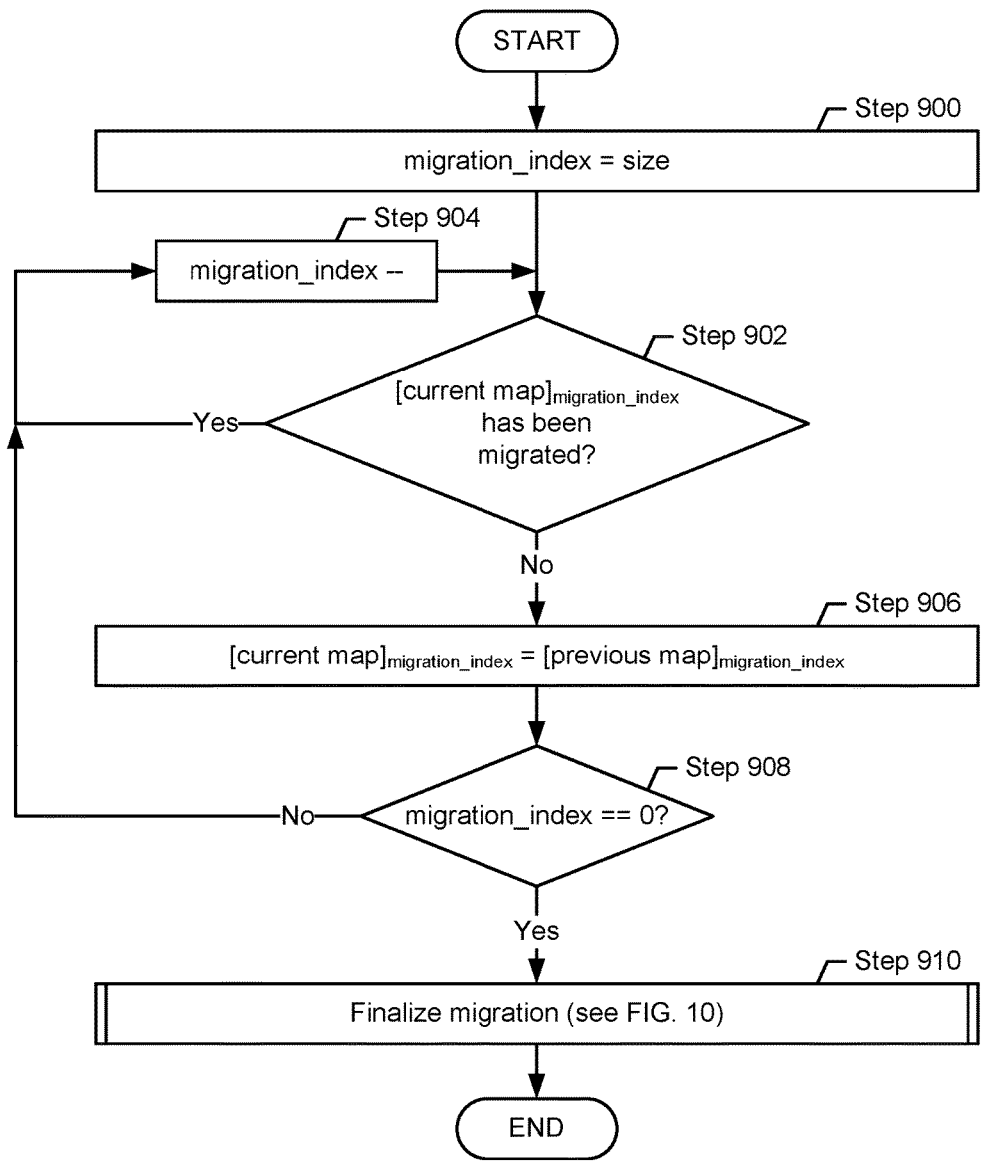

FIG. 9 shows a method for performing a sweep migration, in accordance with one or more embodiments of the technology. The sweep migration may be used to migrate any data fragments that have not yet been migrated. The steps described below may be performed consecutively for all remaining data fragments to be migrated, or they may be performed spaced over time, to avoid generating a burst of data transfers from the previous memory region to the current memory region, which may adversely affect the performance of potentially concurrently occurring read and/or write operations.

Turning to FIG. 9, in Step 900, "migration_index" is set to the size of the storage object. "migration_index", in accordance with an embodiment of the technology, points to the last memory location of the current memory region.

In Step 902, a determination is made about whether a migration has already been performed for the memory location of the current memory region that is addressed by "migration_index". The determination may be made by reading the data fragment from the memory location that the migration index is pointing to. If a pre-migration marker is obtained, a determination is made that the data fragment located in the corresponding memory location of the previous memory region has not yet been migrated. Alternatively, any other obtained data fragment (i.e., any data fragment that is different from the pre-migration marker) indicates that a data fragment of the storage object has been written to the memory location, and that the migration has thus been performed.

If a determination is made that a migration has already been performed for the memory location that is addressed by "migration_index", the method may return to Step 900, after decrementing "migration index" in Step 904. If, however, a determination is made that the migration has not yet been performed, the method may proceed to Step 906.

In Step 906, the data fragment stored at the memory location of the previous memory region, address by "migration_index", is copied to the memory location of the current memory region, addressed by "migration_index". The data fragment obtained from the previous memory region thus overwrites the pre-migration marker in the current memory region.

In Step 908, a determination is made about whether "migration_index" is equal to zero. A "migration_index" equal to zero indicates that all data fragments of the storage object have been migrated.

If "migration_index" has not yet reached zero, the migration index is decremented in Step 904, and subsequently the method returns to Step 902.

Figure 10:
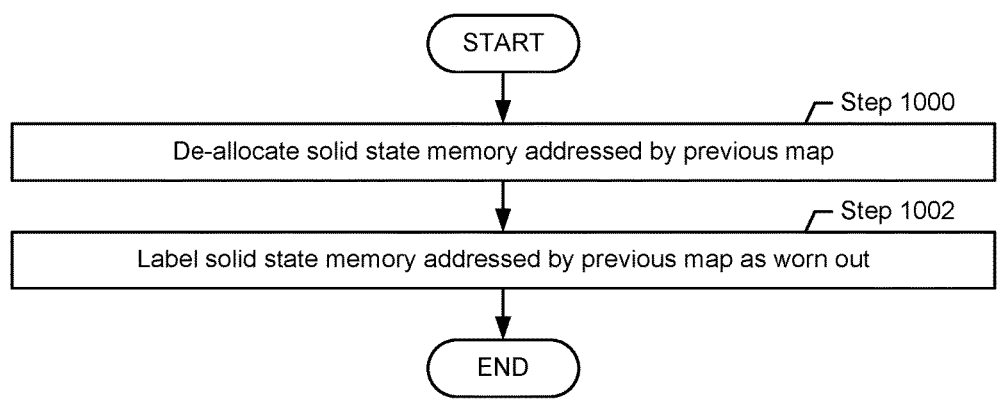

If "migration_index" has reached zero, the method may proceed to Step 910, where the migration from the previous to the current memory region is finalized, as further described in FIG. 10. Progression to Step 910 may result in a state transition from migration state 1 to migration state 3 (see FIG. 3).

The sweep migration, described in FIG. 9, is performed in a direction from the last memory location of the memory region to the first memory location of the memory region. Those skilled in the art will recognize that the sweep migration may alternatively be performed in a direction from the first memory location to the last memory location, without departing from the technology. Further, the sweep migration of data fragments may be performed in any other order.

FIG. 10 shows a method for finalizing the migration, in accordance with one or more embodiments of the technology. The method shown in FIG. 10 may be performed while the system is in migration state 3. After completion of the method, a state transition back to the non-migration state may occur.

In Step 1000, the memory region addressed by the previous map is de-allocated. The previous map may no longer be maintained and may be erased from memory. In Step 1002, the memory region, addressed by the previous map, may be labeled as worn out. Labeling the memory region as worn out may prevent future accidental use of the memory region for storage.

Example Use Case

The use case scenario described below is intended to provide an example of the method for data migration in solid state memory, described in FIGS. 3-10, and is for illustrative purposes only. The use case scenario is based on a system similar to the one shown in FIG. 1, in which data is written to/read from a memory region of a solid state memory module. One skilled in the art will recognize that the methods described in FIGS. 3-10 are not limited to the use case scenario described below, but rather are universally applicable to a wide range of solid state memory-based systems of different configuration, complexity and size.

Consider a scenario in which a memory region is used to store data that includes five data fragments A-E. FIGS. 11A-11D show this memory region as methods, in accordance with one or more embodiments of the technology, are performed on the memory region.

Figure 11A:
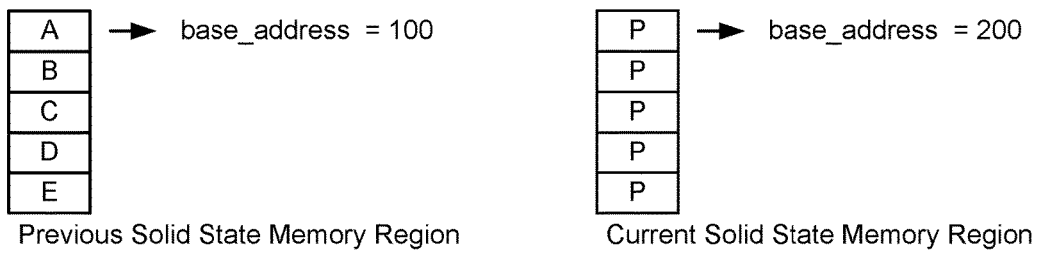

As shown in FIG. 11A, the data fragments A-E are stored in consecutive order. The physical memory region begins at base address "100", and because the data fragments are stored in consecutive order, the first data fragment "A" is stored in a memory location at the start address "0", i.e., at physical location "100". The size of the storage object is "5".

To write and/or read to/from the memory region, the methods described in FIGS. 6 and 7, respectively are used.

In the use case scenario, the system is configured such that eventually a migration of the data to a new memory region is due because the current memory region is reaching its wear limit and may no longer guarantee reliable storage of the data. Accordingly, a new memory region of suitable size is allocated. The physical memory region of the new current memory region begins at base address "200". Assume that the current solid state memory region, prior to the migration, is in the state shown in the left panel of FIG. 11A. The old current memory region is redefined to be the previous memory region As shown in FIG. 11A, the previous memory region, beginning at base address 100, and the current memory region, beginning at base address 200, coexist. However, while the previous memory region includes data fragments A-E, the memory locations of the current memory region are populated with pre-migration markers, "P".

Figure 11B:
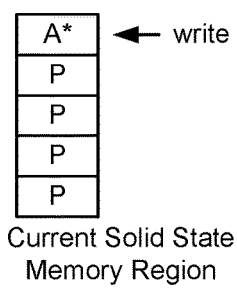

FIG. 11B shows the current memory region after a write operation, as described in FIG. 6 has been performed. Memory fragment A* has been written to the first memory location of the current memory region, thus replacing the pre-migration marker.

In FIGS. 11C1-11C3, a read operation, as described in FIG. 7 is performed. In FIG. 11C1, the fourth memory location of the current memory region is read. A determination is made that the memory location contains a pre-migration marker. As a result, in FIG. 11C2, the fourth memory location of the previous memory region is read. The memory location contains data fragment "D", which is provided to the client that requested the data fragment, and in addition is written to the fourth memory location of the current memory region, as shown in FIG. 11C3.

Figure 11D:
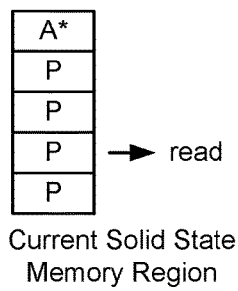
Figure 11D:
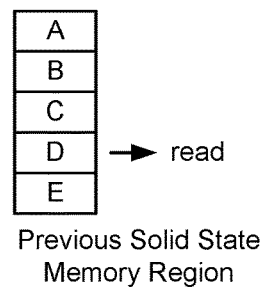
Figure 11D:
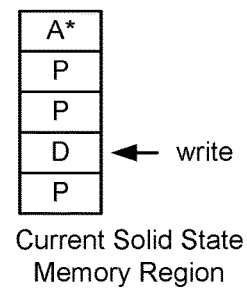
Figure 11D:
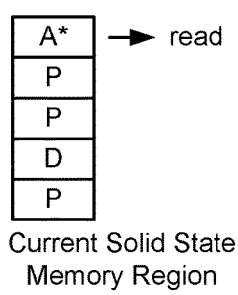

In FIG. 11D, a read request is received for the first memory location. Accordingly, data fragment A* is read.

Subsequently performed read and/or write requests may, over time, result in a complete migration of all data fragments to the current memory region. If not all data fragments are migrated by the time the migration time limit expires, a sweep migration is performed to migrate the remaining data fragments from the previous memory region to the current memory region.

Embodiments of the technology may enable solid state storage systems to mitigate the effects of repeated writing to solid state memory of the solid state storage system that would otherwise, over time, result in failure of the solid state memory. In a system in accordance with one or more embodiments of the technology, wear leveling is used to reduce the effect of frequently written data fragments on individual memory locations. Further, once a memory region is detected to reach its wear limit, the data in the memory region is migrated to a new memory region, in accordance with one or more embodiments of the technology. The above measures, in combination, may significantly prolong the lifetime of the solid state memory while ensuring integrity of the stored data.

The wear level and migration operations are performed such that they may only minimally affect regular read and write operations from/to the solid state memory. Reading and writing, in accordance with an embodiment of the technology, are possible at any time, as a wear level or migration operation is performed. Wear level and migration operations in accordance with an embodiment of the technology cause only a minimal processing burden and require only minimal resources, thus minimizing delays of read and/or write operations that are performed during wear level or migration operations.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for adaptively migrating data in solid state memory, the method comprising:
   making a first determination that a write limit of a first memory region of the solid state memory has been reached, wherein the first memory region comprises a first memory location and wherein the first memory location comprises a first data fragment, and based on the first determination:
      allocating a second memory region of the solid state memory;
      writing a pre-migration marker to a second memory location of the second memory region;
   after writing the pre-migration marker to the second memory location:
      receiving, from a client, a first read request comprising a first logical address;
      identifying the second memory location in the second memory region, based on the first logical address and a current map;
      reading a second data fragment from the second memory location;
      making a second determination that the first data fragment has not been migrated to the second memory location based on the second data fragment comprising the pre-migration marker, and based on the second determination:
         identifying the first location in the first memory region based on the first logical address and a previous map;
         obtaining the first data fragment from the first memory location;
         writing the first data fragment to the second memory location; and
         providing the first data fragment to the client.

2. The method of claim 1, wherein the second memory region has a base address different from a base address of the first memory region.

3. The method of claim 1 further comprising:
   sending the second data fragment to the client.

4. The method of claim 1, wherein the pre-migration marker is an invalid data pattern that, when read, causes a read error.

5. The method of claim 1, further comprising:
   receiving a second request to read a data fragment from a second logical address;
   identifying a third memory location in the second memory region, based on the second logical address; and
   making a third determination that a third data fragment at the third memory location is not a pre-migration marker, and based on the third determination:
      sending the third data fragment to the client.

6. The method of claim 1 further comprising:
   receiving, from the client, a request to write a third data fragment to a second logical address;
   identifying a third memory location in the second memory region, based on the second logical address; and
   writing the third data fragment to the third memory location.

7. The method of claim 1, further comprising:
   making a third determination that a migration time limit has been exceeded, and based on the third determination:
      performing a sweep migration.

8. The method of claim 1, further comprising:
   making a third determination that the pre-migration markers in all memory locations of the second memory region have been overwritten, and based on the third determination:
      de-allocating the first memory region; and
      labeling the first memory region as worn out.

9. The method of claim 1, further comprising, prior to making the first determination:
   performing at least one wear level operation.

10. A non-transitory computer readable medium (CRM) storing instructions for adaptively migrating data in solid state memory, the instructions comprising functionality for:
    making a first determination that a write limit of a first memory region of the solid state memory has been reached, wherein the first memory region comprises a first memory location and wherein the first memory location comprises a first data fragment, and based on the first determination:
       allocating a second memory region of the solid state memory;
       writing a pre-migration marker to a second memory location of the second memory region;
    after writing the pre-migration marker to the second memory location:
       receiving, from a client, a first read request comprising a first logical address;
       identifying the second memory location in the second memory region, based on the first logical address and a current map;
       reading a second data fragment from the second memory location;
       making a second determination that the first data fragment has not been migrated to the second memory location based on the second data fragment comprising the pre-migration marker, and based on the second determination:
          identifying the first location in the first memory region based on the first logical address and a previous map;
          obtaining the first data fragment from the first memory location;
          writing the first data fragment to the second memory location; and
          providing the first data fragment to the client.

11. The non-transitory CRM of claim 10, wherein the pre-migration marker is an invalid data pattern that, when read, causes a read error.

12. The non-transitory CRM of claim 10, wherein the instructions further comprise functionality for:
    receiving a second request to read a data fragment from a second logical address;
    identifying a third memory location in the second memory region, based on the second logical address; and
    making a third determination that a third data fragment at the third memory location is not a pre-migration marker, and based on the third determination:
       sending the third data fragment to the client.

13. The non-transitory CRM of claim 10, wherein the instructions further comprise functionality for:
    receiving, from the client, a request to write a third data fragment to a second logical address;

identifying a third memory location in the second memory region, based on the second logical address; and writing the third data fragment to the third memory location.

14. The non-transitory CRM of claim 10, wherein the instructions further comprise functionality for:

making a third determination that a migration time limit has been exceeded, and based on the third determination:

performing a sweep migration.

15. A system for adaptively migrating data in solid state memory, comprising:

at least one storage module comprising solid state memory, and a control module configured to:

make a first determination that a write limit of a first memory region of the solid state memory has been reached, wherein the first memory region comprises a first memory location and wherein the first memory location comprises a first data fragment, and based on the first determination:

allocate a second memory region of the solid state memory;

write a pre-migration marker to a second memory location of the second memory region;

after writing the pre-migration marker to the second memory location:

receive, from a client, a first request to read a data fragment from a first logical address;

identify a first memory location in the second memory region, based on the first logical address and a current map for the data fragment;

make a second determination that the first data fragment has not been migrated to the second memory location based on the second data fragment comprising the pre-migration marker, and based on the second determination:

identify the first location in the first memory region based on the first logical address and a previous map;

obtain the first data fragment from the first memory location;

write the first data fragment to the second memory location; and provide the first data fragment to the client.

16. The system of claim 15, wherein the pre-migration marker is an invalid data pattern that, when read, causes a read error.

17. The system of claim 15, wherein the control module is further configured to:

receive a second request to read a data fragment from a second logical address;

identify a third memory location in the second memory region, based on the second logical address; and make a third determination that a third data fragment at the third memory location is not a pre-migration marker, and based on the third determination:

send the third data fragment to the client.

18. The system of claim 15, wherein the control module is further configured to:

receive, from the client, a request to write a third data fragment to a second logical address;

identify a third memory location in the second memory region, based on the second logical address; and write the third data fragment to the third memory location.

19. The system of claim 15, wherein the control module is further configured to:

make a third determination that a migration time limit has been exceeded, and based on the third determination:

perform a sweep migration.

20. The system of claim 15, wherein the control module is further configured to, prior to making the first determination:

perform at least one wear level operation.

* * * * *